United States Patent
Vanspauwen

(12) 
(10) Patent No.: US 7,032,727 B2
(45) Date of Patent: Apr. 25, 2006

(54) SHOCK ABSORBER HAVING A HYDRAULIC STOP

(75) Inventor: Vincent Vanspauwen, Hoepertingen (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/937,838

(22) Filed: Sep. 9, 2004

(65) Prior Publication Data

US 2006/0049014 A1    Mar. 9, 2006

(51) Int. Cl.
*F16F 9/48* (2006.01)

(52) U.S. Cl. .................. 188/284; 188/282.5; 188/313; 188/319.1; 267/221; 267/226

(58) Field of Classification Search .............. 188/284, 188/282.5, 319.1, 313, 315; 267/226, 221
See application file for complete search history.

(56) References Cited

U.S. PATENT DOCUMENTS

| | | | | |
|---|---|---|---|---|
| 2,599,477 A | * | 6/1952 | Patriquin | 188/284 |
| 2,606,630 A | * | 8/1952 | Rossman | 188/284 |
| 4,312,499 A | * | 1/1982 | Wossner et al. | 267/226 |
| 4,328,960 A | * | 5/1982 | Handke et al. | 267/226 |
| 5,368,141 A | * | 11/1994 | Clarke | 188/284 |
| 5,467,851 A | * | 11/1995 | Handke et al. | 188/313 |
| 5,501,438 A | * | 3/1996 | Handke et al. | 267/226 |
| 5,810,130 A | * | 9/1998 | Mc Candless | 188/322.22 |
| 6,129,343 A | * | 10/2000 | Ecarnot | 267/64.11 |
| 6,318,523 B1 | * | 11/2001 | Moradmand et al. | 188/280 |
| 6,626,274 B1 | * | 9/2003 | Pfundstein et al. | 188/284 |
| 2004/0060787 A1 | | 4/2004 | Nakamura et al. | |

FOREIGN PATENT DOCUMENTS

| EP | 0 864 774 A1 | 9/1998 |
|---|---|---|
| EP | 1 477 343 A3 | 12/2004 |

OTHER PUBLICATIONS

Copy of Search Report dated Oct. 20, 2005.

* cited by examiner

*Primary Examiner*—James McClellan
*Assistant Examiner*—Mariano Sy
(74) *Attorney, Agent, or Firm*—Harness, Dickey & Pierce, PLC

(57) ABSTRACT

A shock absorber includes a hydraulic stop. The hydraulic stop includes two housings connected together by a spring. At the end of the stroke of the shock absorber, the piston causes the two housings to approach each other thereby causing fluid disposed between the housings to flow through a bleed passage. The size or total area of the bleed passage will determine the amount of hydraulic damping provided by the hydraulic stop.

18 Claims, 8 Drawing Sheets

SHOCK ABSORBER HAVING A HYDRAULIC STOP

FIELD OF THE INVENTION

The present invention relates to a hydraulic damper or shock absorber having rebound damping for use in a suspension system such as the suspension systems used for automotive cars and trucks. More particularly, the present invention relates to a hydraulic damper or shock absorber having rebound damping that provides a hydraulic cushion for the hydraulic damper or shock absorber just prior to full extension of the hydraulic damper or shock absorber.

BACKGROUND OF THE INVENTION

A conventional mono-tube shock absorber comprises a cylinder defining a working chamber having a piston slidably engaging the cylinder within the working chamber. The piston divides the working chamber into an upper working chamber and a lower working chamber. A piston rod is connected to the piston and the piston rod extends through the upper working chamber and through one end of the cylinder. An extension valving system is incorporated into the piston for generating a damping force during an extension stroke of the shock absorber and a compression valving system is incorporated into the piston for generating a damping force during a compression stroke of the shock absorber. In a dual tube shock absorber, a reservoir tube surrounds the pressure tube to define a reservoir chamber. A base valve assembly controls fluid flow between the working chamber and the reservoir chamber. An extension valving system is incorporated into the piston for generating a damping force during an extension stroke of the shock absorber and a compression valving system is incorporated into the base valve assembly for generating a damping force during a compression stroke of the shock absorber. The piston includes a compression valving system to regulate the pressure drop across the piston during the compression stroke and the base valve assembly includes an extension valving system to regulate the pressure drop across the base valve system during the extension stroke.

In some applications, the shock absorber is required to limit the full extension travel of the vehicle's suspension system. When the shock absorber is used as an extension stop for the vehicle's suspension system, it is important to provide some type of mechanism or system which provides a cushion for this stop to avoid the excessive loading and/or noise which occurs when there is a metal to metal stop. Built into the shock absorber, one typical extension stop is a resilient bumper made of some type of elastomeric material. The bumper is designed to cushion the impact between the piston and the top of the pressure tube. While these types of extension stops help to cushion the impact, they still provide an abrupt means for limiting the travel and the elastomeric material may experience heat degradation which reduces its ability to limit the impact.

Another type of extension stop that has been developed is to provide additional hydraulic damping force acting against the piston during the extension stroke when the piston approaches the end of the pressure tube. These systems are known as "hydraulic extension cut-off" or "stop" and they have been effective at cushioning the impact between the piston and the end of the shock absorber.

While the prior art hydraulic extension cut-off designs have been effective at reducing both the loads and the noise associated with the impact between the piston and the end of the pressure tube, the costs and complexities of these designs is excessive and easier and less costly designs or systems are needed which can provide the same and/or additional features.

SUMMARY OF THE INVENTION

The present invention provides the art with a simpler and less costly hydraulic extension stop system. The system includes a pair of plastic retainers which define a damping chamber located at the extension end of the shock absorber. When the piston engages the lower retainer, the hydraulic fluid in the damping chamber is forced through a bleed passage to dampen the movement of the piston as it reaches the full extension position. A spring disposed between the pair of plastic retainers returns the lower retainer to its original position upon a compression movement of the shock absorber.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
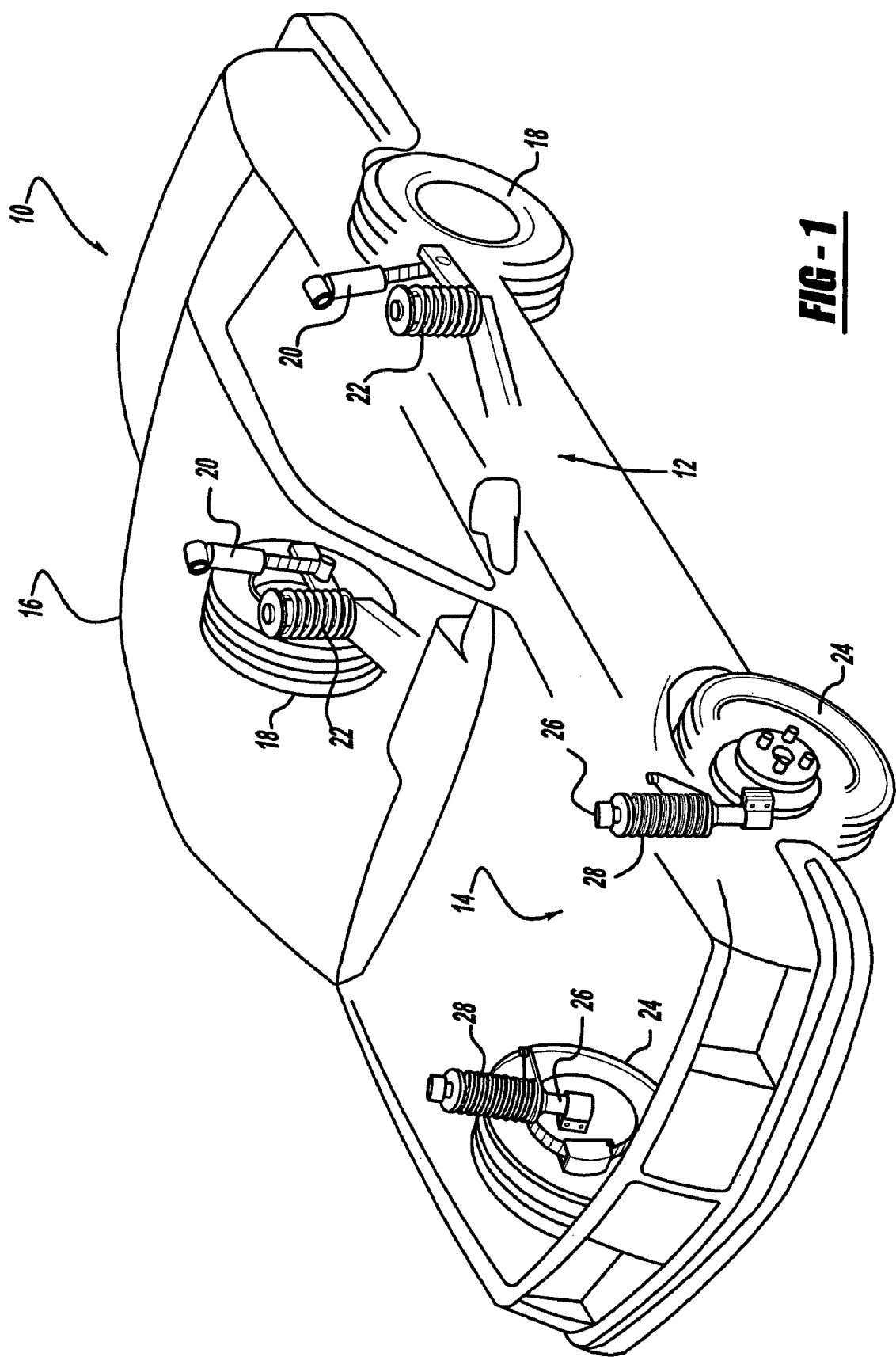
FIG. 1 is a perspective illustration of an automobile which includes shock absorbers which incorporate the hydraulic extension cut-off in accordance with the present invention.

The following description of the preferred embodiment(s) is merely exemplary in nature and is in no way intended to limit the invention, its application, or uses. Referring now to the drawings in which like reference numerals designate like or corresponding parts throughout the several views, there is shown in FIG. 1, a vehicle incorporating a suspension system having shock absorbers which include the hydraulic extension stop in accordance with the present invention and which is designated generally by the reference numeral 10.

Vehicle 10 includes a rear suspension 12, a front suspension 14 and a body 16. Rear suspension 12 includes a rear axle assembly (not shown) adapted to operatively support a pair of rear wheels 18. The rear axle assembly is operatively connected to body 16 by means of a pair of rear shock absorbers 20 and a pair of rear helical coil springs 22. Similarly, front suspension 14 includes a front axle assembly (not shown) adapted to operatively support a pair of front wheels 24. The front axle assembly is operatively connected to body 16 by a pair of front shock absorbers 26 and by a pair of front helical coil springs 28. Shock absorbers 20 and 26 serve to dampen the relative motion of the unsprung portion (i.e., front and rear suspensions 12 and 14, respectively) from the sprung portion (i.e. body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating independent or non-independent front and rear suspension assemblies. Further, the term "shock absorber" as used herein is meant to refer to dampers in general and thus will include McPherson struts.

Figure 2:
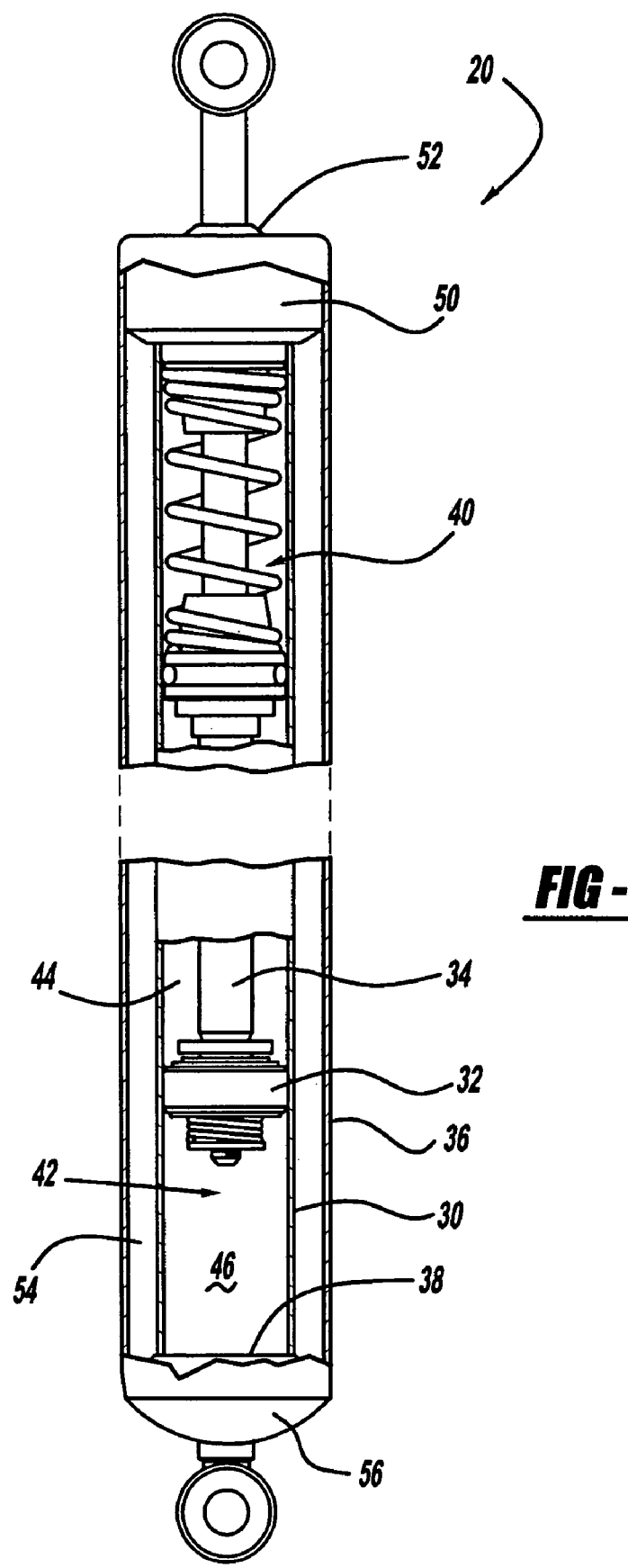
FIG. 2 is a cross-sectional side view of a dual tube shock absorber incorporating the hydraulic extension cut-off in accordance with the present invention.

Referring now to FIG. 2, rear shock absorber 20 is shown in greater detail. While FIG. 2 shows only rear shock absorber 20, it is to be understood that front shock absorber 26 also includes the hydraulic extension stop in accordance with the present invention which is described below for rear shock absorber 20. Front shock absorber 26 only differs from rear shock absorber 20 in the way in which it is adapted to be connected to the sprung and the unsprung portions of vehicle 10. Shock absorber 20 comprises a pressure tube 30, a piston assembly 32, a piston rod 34, a reservoir tube 36, a base valve assembly 38 and a hydraulic extension stop 40.

Pressure tube 30 defines a working chamber 42. Piston assembly 32 is slidably disposed within pressure tube 30 and it divides working chamber 42 into an upper working chamber 44 and a lower working chamber 46.

Figure 4:
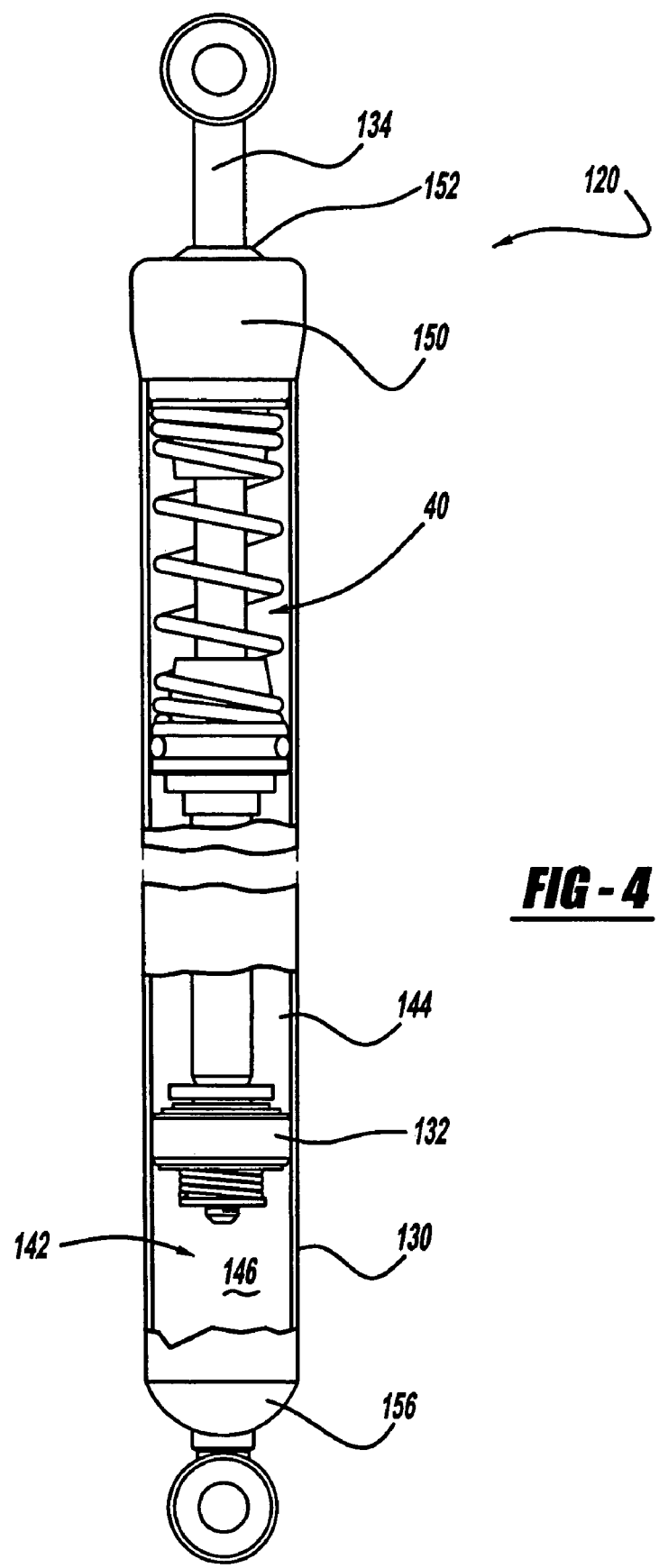
FIG. 4 is a cross-sectional side view of a mono-tube shock absorber incorporating they hydraulic extension cut-off in accordance with the present invention.

Piston rod 34 is attached to piston assembly 32 and it extends through upper working chamber 44, through hydraulic extension stop 40 and through an upper end cap 50 which closes the upper end of both pressure tube 30 and reservoir tube 36. A sealing system 52 seals the interface between upper end cap 50, pressure tube 30, reservoir tube 36 and piston rod 34. The end of piston rod 34 opposite to piston assembly 32 is adapted, in the preferred embodiment, to be secured to the sprung portion of vehicle 10. Valving within piston assembly 32 creates a damping force by controlling the movement of fluid between upper working chamber 44 and lower working chamber 46 during an extension stroke of piston assembly 32 with respect to pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 from the amount of fluid displaced in lower working chamber 46. This difference in the amount of fluid displaced is known as the "rod volume" and it flows through base valve assembly 38. Valving in base valve assembly 38 creates a damping force by controlling the movement of fluid between lower working chamber 46 and a reservoir chamber 54 defined between pressure tube 30 and reservoir tube 36 during a compression stroke of piston assembly 32 with respect to pressure tube 30. While shock absorber 20 is being illustrated as a dual tube shock absorber having base valve assembly 38, it is within the scope of the present invention to utilize pressure tube 30 and piston assembly 32 in a mono-tube designed shock absorber as shown in FIG. 4 and detailed below.

Reservoir tube 36 surrounds pressure tube 30 to define reservoir chamber 54 located between tubes 30 and 36. The bottom end of reservoir tube 36 is closed by an end cap 56 which is adapted, in the preferred embodiment, to be connected to the unsprung portion of vehicle 10. The upper end of reservoir tube 36 is attached to upper end cap 50. Base valve assembly 38 is disposed between lower working chamber 46 and reservoir chamber 54 to control the flow of fluid between the two chambers. When shock absorber 20 extends in length (extension or rebound), an additional volume of fluid is needed in lower working chamber 46 due to the "rod volume" concept. Thus, fluid will flow from reservoir chamber 54 to lower working chamber 46 through base valve assembly 38. This fluid flow will not create a damping force. The damping force in an extension stroke is created by valving in piston assembly 32. When shock absorber 20 compresses in length (compression), replacement fluid for upper working chamber 44 flows through piston assembly 32. This fluid flow also does not create a damping force. An excess amount of fluid must be removed from lower working chamber 46 due to the "rod volume" concept. Thus, fluid flow will flow from lower working chamber 46 to reservoir chamber 54 through valving in base valve assembly 38 to create a damping force during the compression stroke.

The present invention is directed to a unique hydraulic extension stop 40 which is engaged by piston assembly 32 as piston assembly 32 approaches upper end cap 50. Hydraulic extension stop 40 cushions any impact that may occur between piston assembly 32 and upper end cap 50.

Figure 3:
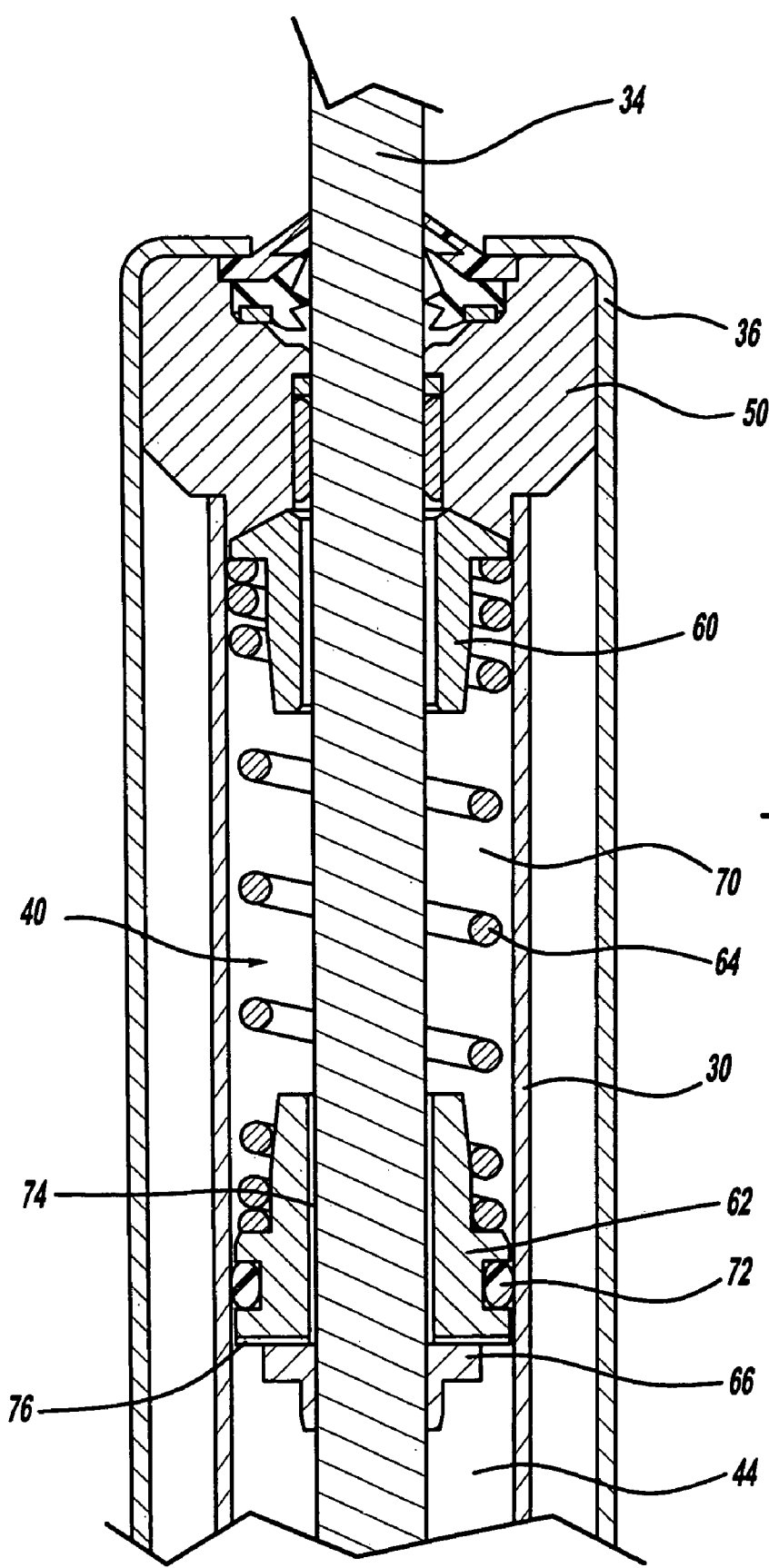
FIG. 3 is an enlarged cross-sectional view of the extension end of the shock absorber illustrated in FIG. 2.

Referring now to FIGS. 2 and 3, hydraulic extension stop 40 comprises a first or an upper retainer 60, a second or a lower retainer 62, a coil spring 64 and a collar 66. Upper retainer 60 is slidingly disposed within pressure tube 30 at a position where it abuts upper end cap 50. Coil spring 64 is press fit within pressure tube 30 and it engages upper retainer 60 to keep upper retainer 60 positioned against upper end cap 50. The press fitting of coil spring 64 within pressure tube 30 prevents hydraulic extension stop 40 from coming down during the normal functioning of shock absorber 20.

Coil spring 64 is also press fitted onto lower retainer 62. Upper retainer 60 and lower retainer 62 are preferably manufactured from plastic and they are designed to prevent coil spring 64 from reaching its fully collapsed position. The end of the extension stroke for shock absorber 20 will be defined when piston assembly 32 contacts collar 66, when collar 66 contacts lower retainer 62, when lower retainer 62 contacts upper retainer 60 and when upper retainer 60 contacts upper end cap 50. The initial point of contact between collar 66 and lower retainer 62 can be changed by changing the free length of coil spring 64.

Upper retainer 60 and lower retainer 62 define a damping chamber 70 disposed within upper working chamber 44 of working chamber 42. An O-ring 72 seals damping chamber 70 from the rest of upper working chamber 44. A fluid passage 74 is defined between lower retainer 62 and piston rod 34 and between upper retainer 60 and piston rod 34. Lower retainer 62 defines one or more radially extending slots or bleed passages 76 that extend between fluid passage 74 and upper working chamber 44. Collar 66 is slidingly received on piston rod 34. Collar 66 has a generally flat upper surface such that once collar 66 engages the lower surface of lower retainer 62, fluid flow from fluid passages 74 can only flow through bleed passages 76.

During an extension stroke of shock absorber 20, piston assembly 32 will contact collar 66 which will then contact lower retainer 62 to limit the fluid flow from damper chamber 70 to only fluid flow through bleed passages 76. As shock absorber 20 continues its extension stroke and piston assembly 32 is moved towards end cap 50, lower retainer 62 will be moved toward upper retainer 60 against the force of coil spring 64 to reduce the volume of damping chamber 70. The fluid within damping chamber 70 will be forced to flow through fluid passages 74 and through bleed passages 76. The restricted fluid flow through bleed passages 76 creates an additional damping force which will cushion the impact when shock absorber 20 reaches its fully extended position. The amount of fluid flow and thus the additional damping force can be adjusted by adjusting the size and number and thus the total area of bleed passages 76.

When shock absorber 20 moves in compression from the fully extended position back towards its working height, coil spring 64 will again separate lower retainer 62 from upper retainer 60 to bring the volume of damping chamber 70 back to its original size. Due to the ability of collar 66 to move with piston rod 34 during the compression stroke, fluid flow may not be restricted to bleed passages 76 during this compression stroke and fluid flow may be able to flow directly through fluid passages 74 when lower retainer 62 moves back to its original position. If collar 66 remains in contact with lower retainer 62, fluid flow will only occur through bleed passages 76.

Referring now to FIG. 4, a rear shock absorber 120 in accordance with another embodiment of the present invention is illustrated. Shock absorber 120 can replace rear shock absorber 20 or with the same modifications that would have to be made to rear shock absorber 20, shock absorber 120 could replace front shock absorber 26. Shock absorber 120 is a mono-tube design and it comprises a pressure tube 130, piston assembly 132, a piston rod 134 and hydraulic extension stop 40.

Pressure tube 130 defines a working chamber 142. Piston assembly 132 is slidably disposed within pressure tube 130 and it divides working chamber 142 into an upper working chamber 144 and a lower working chamber 146.

Piston rod 134 is attached to piston assembly 132 and it extends through upper working chamber 144, through hydraulic extension stop 40 and through an upper end cap 150 which closes the upper end of pressure tube 130. A sealing system 152 seals the interface between upper end cap 150, pressure tube 130 and piston rod 134. The end of piston rod 134 opposite to piston assembly 132 is adapted, in the preferred embodiment, to be secured to the sprung portion of vehicle 10. Valving within piston assembly 132 creates a damping force for controlling the movement of fluid between upper working chamber 144 and lower working chamber 146 during both an extension stroke of piston assembly 132 with respect to pressure tube 130 and a compression stroke of piston assembly 132 with respect to pressure tube 130. Because piston rod 134 extends only through upper working chamber 144 and not lower working chamber 146, movement of piston assembly 132 with respect to pressure tube 130 causes a difference in the amount of fluid displaced in upper working chamber 144 from the amount of fluid displaced in lower working chamber 146. This difference in the amount of fluid displaced is known as the "rod volume" and it is accommodated for by an additional piston disposed within lower working chamber 146 as is known in the art or by any other method of accommodating the rod flow which is known in the art. The bottom of pressure tube 130 is closed by an end cap 156 which is adapted, in the preferred embodiment, to be connected to the unspurng portion of vehicle 10.

Hydraulic extension stop 40 is engaged by piston assembly 132 as piston assembly 132 approaches upper end cap 150 in the same manner as described above for piston assembly 32 and upper end cap 50. The function, operation and features of hydraulic extension stop 40 and shock absorber 120 are the same as described above for hydraulic extension stop 40 and shock absorber 20.

Figure 5:
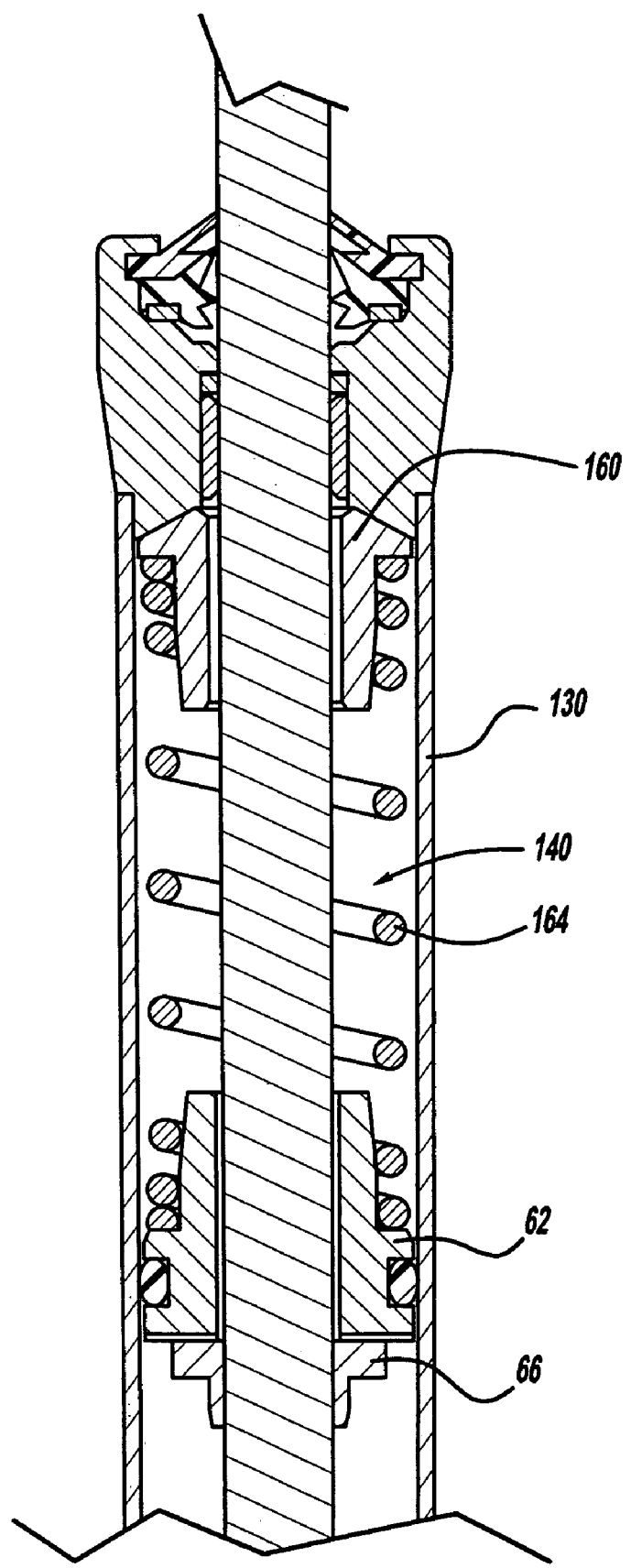
FIG. 5 is a view similar to FIG. 3 but illustrating a hydraulic extension stop in accordance with another embodiment of the present invention.

Referring now to FIG. 5, a hydraulic extension stop 140 in accordance with another embodiment of the present invention is illustrated. Hydraulic extension stop 140 comprises an upper retainer 160, lower retainer 62, a coil spring 164 and collar 66. Upper retainer 160, similar to upper retainer 60, is preferably manufactured from plastic. Hydraulic extension stop 140 is the same as hydraulic extension stop 40 except for the method used to keep hydraulic extension stop 140 adjacent upper end cap 50.

As described above for hydraulic extension stop 40, upper retainer 60 is slidingly disposed within pressure tube 30 and coil spring 64 is press fit within pressure tube 30 to keep hydraulic extension stop 40 adjacent upper end cap 50.

Hydraulic extension stop 140 has upper retainer 160 press fit within pressure tube 30 and coil spring 164 is press fit over upper retainer 160 to keep hydraulic extension stop 140 adjacent upper end cap 50. The features, function, operation and advantages for hydraulic extension stop 140 are the same as those detailed above for hydraulic extension stop 40. Also, while hydraulic stop 140 is illustrated in conjunction with a mono tube shock absorber, it is within the scope of the present invention to use hydraulic extension stop 140 with a dual tube shock absorber.

Figure 6:
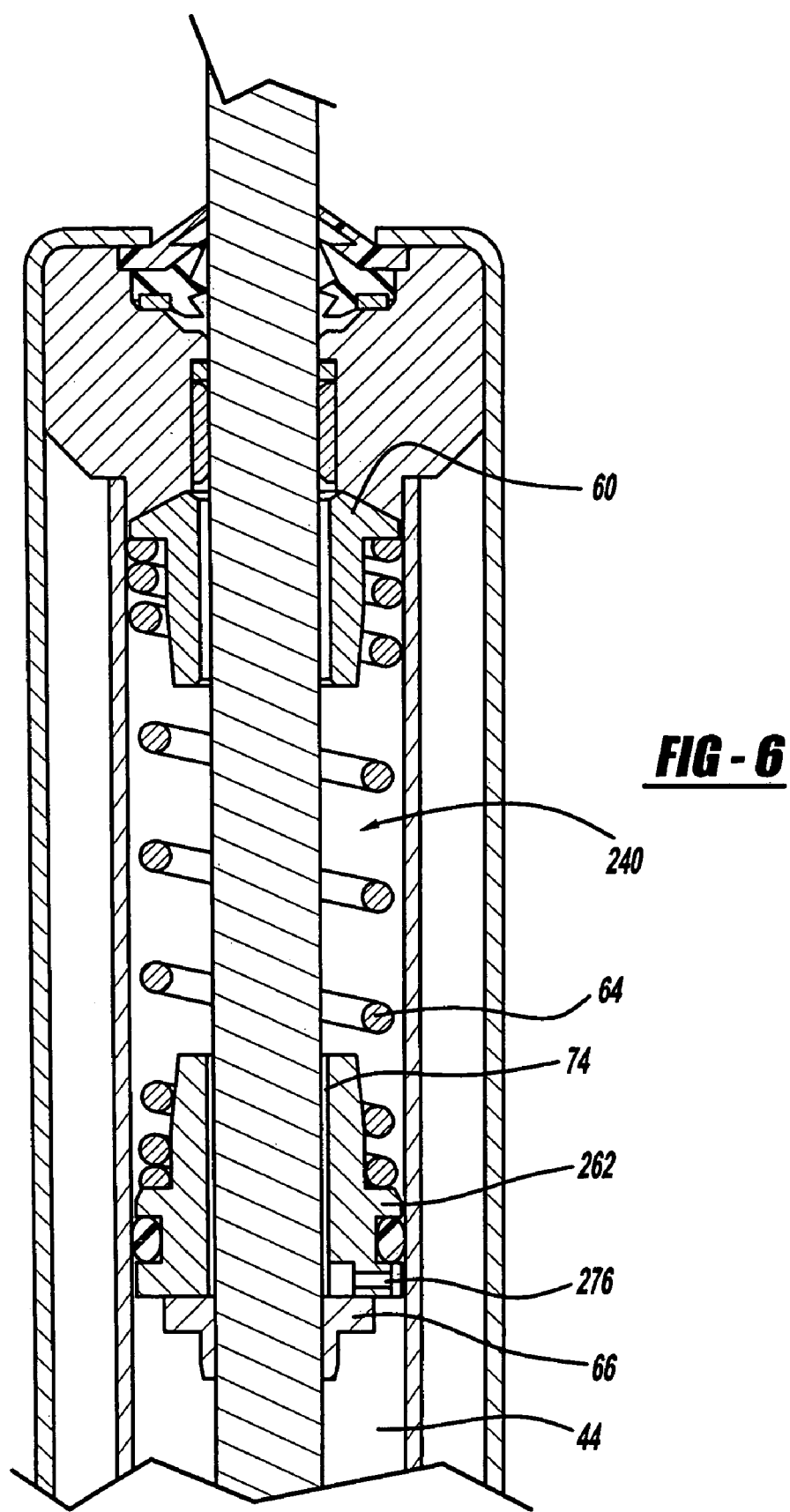
FIG. 6 is a view similar to FIG. 3 but illustrating a hydraulic extension stop in accordance with another embodiment of the present invention.

Referring now to FIG. 6, a hydraulic extension stop 240 in accordance with another embodiment of the present invention is illustrated. Hydraulic extension stop 240 comprises upper retainer 60, a lower retainer 262, coil spring 64 and collar 66. Hydraulic extension stop 240 is the same as hydraulic extension stop 40 except that lower retainer 62 has been replaced by lower retainer 262. Lower retainer 262, similar to lower retainer 62, is preferably manufactured from plastic.

Coil spring 64 is press fit onto lower retainer 262. Fluid passage 74 is defined between lower retainer 262 and piston rod 34. Lower retainer 262 defines one or more radially extending holes or bleed passages 276 that extend between fluid passage 74 and upper working chamber 44. Collar 66 has a generally flat upper surface such that once collar 66 engages the lower surface of lower retainer 262, fluid flows from fluid passages 74 can only flow through bleed passages 276. Thus, lower retainer 262 is the same as lower retainer 62 except that bleed passages 76 have been replaced by bleed passages 276. The features, function, operation and advantage of lower retainer 262 and hydraulic extension stop 240 are the same as detailed above for lower retainer 62 and hydraulic extension stop 40. Also, while hydraulic extension stop 240 is illustrated in conjunction with a dual tube shock absorber, it is within the scope of the present invention to use hydraulic stop 240 with a mono tube shock absorber.

Figure 7:
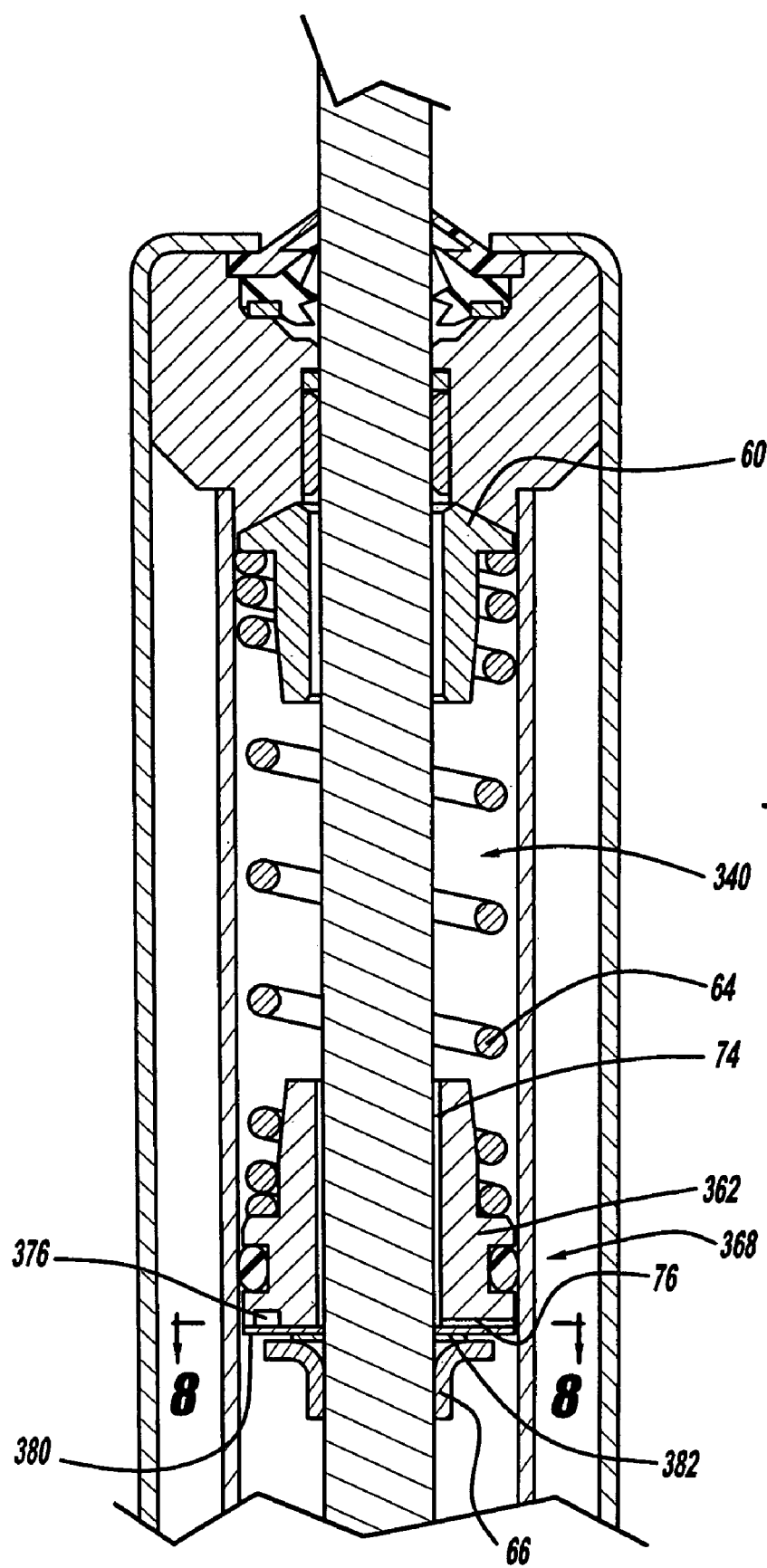
FIG. 7 is a view similar to FIG. 3 but illustrating a hydraulic extension stop in accordance with another embodiment of the present invention.
Figure 8:
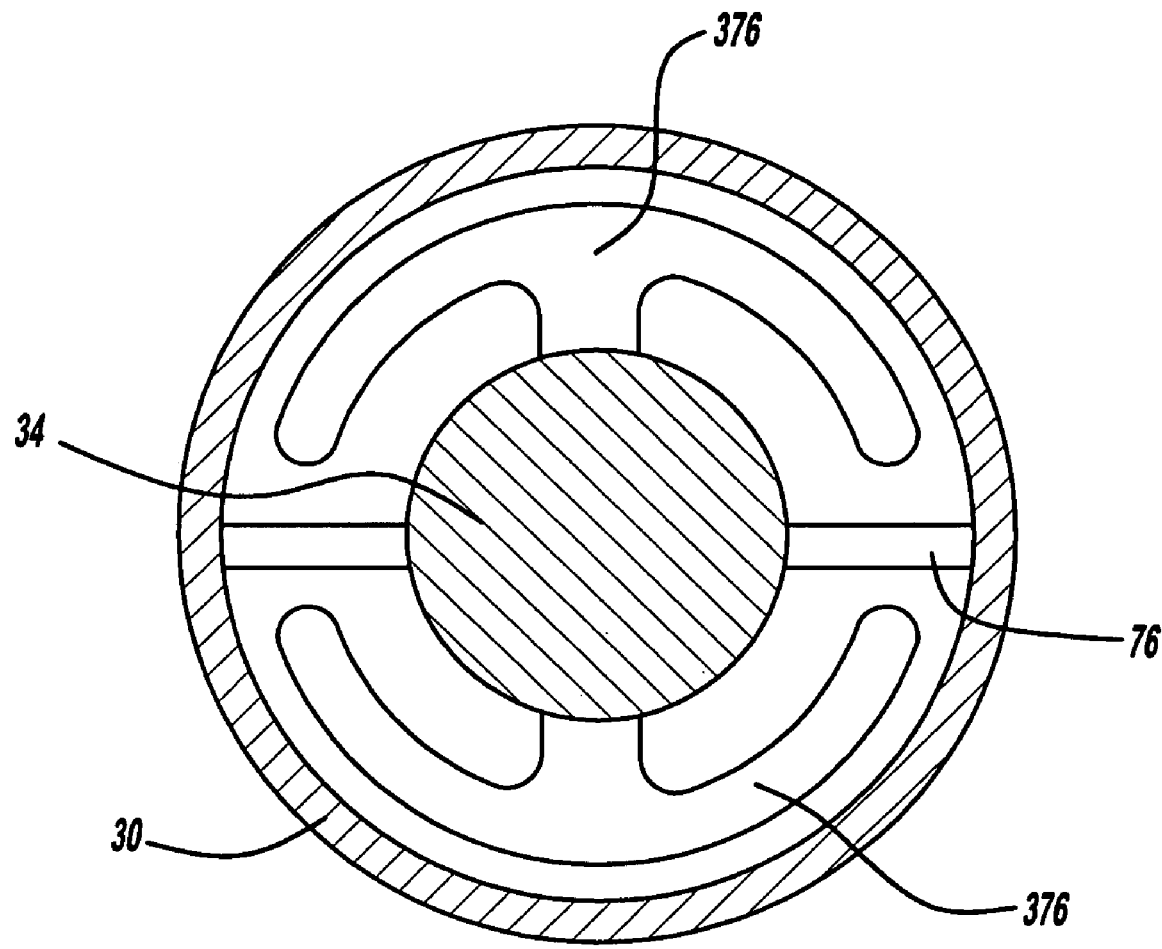
FIG. 8 is an end cross-sectional view of the hydraulic extension stop illustrated in FIG. 7 taken in the direction 8—8 shown in FIG. 7.

Referring now to FIGS. 7 and 8, a hydraulic extension stop 340 in accordance with another embodiment of the present invention is illustrated. Hydraulic extension stop 340 comprises upper retainer 60, a lower retainer 362, coil spring 64, collar 66 and a valve assembly 368. Hydraulic extension stop 340 is the same as hydraulic extension stop 40 except that lower retainer 62 has been replaced by lower retainer 362 and that valve assembly 368 has been added to hydraulic extension stop 340. Lower retainer 362, similar to lower retainer 62, is preferably manufactured from plastic.

Coil spring 64 is press fit onto lower retainer 362. Fluid passage 74 is defined between lower retainer 362 and piston rod 34. Lower retainer 362 defines radially extending bleed passages 76 as well as a fluid chamber 376. Valve assembly 368 comprises a valve disc 380 and a fulcrum disc 382. Valve disc 380 closes fluid chamber 376 to prohibit fluid flow from damping chamber 70, through fluid passages 74, through fluid chamber 376 and into upper working chamber 44. Valve disc 380 and fulcrum disc 382 are slidingly received on piston rod 34.

During an extension stroke of shock absorber 20, piston assembly 32 will contact collar 66 which will then contact fulcrum disc 382 which will then contact valve disc 380. When valve disc 380 contacts lower retainer 362, valve disc 380 will close fluid chamber 376 to limit the fluid flow from damper chamber 70 to only fluid flow through bleed passages 76. As shock absorber 20 continues its extension stroke and piston assembly is moved towards upper end cap 50, lower retainer 362 will be moved toward upper retainer 60 against the force of coil spring 64 to reduce the volume of damper chamber 70. The fluid within damper chamber 70 will be forced to flow through fluid passages 74 and through bleed passages 76. The restricted fluid flow through bleed passages 76 creates an additional damping force which will cushion the impact when shock absorber 20 reaches its fully extended position. If the velocity of piston rod 34 and piston assembly 32 is sufficient to saturate the flow of fluid through bleed passages 76, fluid pressure will increase in damper chamber 70 as well as within fluid chamber 376. The increase in pressure within fluid chamber 376 will eventually bend valve disc 380 over fulcrum disc 382 to release the fluid pressure proportional with the velocity of piston rod 34 and piston assembly 32. The amount of fluid flow through bleed passages 76 as well as the pressure at which valve disc 380 bends and the flow rate past valve disc 380 will be determined by the total area of bleed passages 76, the strength of valve disc 380, the size of fulcrum disc 382 and the size of fluid chamber 376.

When shock absorber 20 moves in compression from the fully extended position back towards its working height, coil spring 64 will again separate lower retainer 362 from upper retainer 60 to bring the volume of damping chamber 70 back to its original size. Due to the ability of collar 66, valve disc 380 and fulcrum disc 382 to move with piston rod 34 during the compression stroke, fluid flow may not be restricted to bleed passages 76 during this compression stroke and fluid flow may be able to flow directly through fluid passages 74 when lower retainer 362 moves back to its original position. If valve disc 380 remains in contact with lower retainer 362, fluid flow will only occur through bleed passages 76.

The features, function, operation and advantage of lower retainer 362 and hydraulic extension stop 340 are the same as detailed above for lower retainer 62 and hydraulic extension stop 40. Also, while hydraulic extension stop 340 is illustrated in conjunction with the dual tube shock absorber, it is within the scope of the present invention to utilize hydraulic extension stop 340 in a mono-tube shock absorber.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shock absorber comprising:
a pressure tube defining a working chamber;
a piston disposed within said working chamber, said piston dividing said working chamber into an upper working chamber and a lower working chamber;
a piston rod attached to said piston, said piston rod extending from said piston to a position outside said pressure tube;
an end cap attached to one end of said pressure tube;
a first retainer disposed within said pressure tube adjacent said end cap, said first retainer slidingly engaging said piston rod;
a second retainer disposed within and sealingly engaging said pressure tube to prohibit fluid flow between an outer circumference of said second retainer and said pressure tube, said second retainer slidingly engaging said piston rod;
a spring disposed between said first and second retainers; wherein:
said first and second retainers define a damping chamber disposed within said working chamber; and
said second retainer defines a bleed passage in communication with said damping chamber and said working chamber.

2. The shock absorber according to claim 1 wherein said spring is press fit within said pressure tube.

3. The shock absorber according to claim 1 wherein said first retainer is press fit within said pressure tube.

4. The shock absorber according to claim 1 wherein said bleed passage is defined by a slot in said second retainer.

5. The shock absorber according to claim 4 further comprising a collar, disposed on said piston rod, said collar engaging said second retainer during movement of said piston with respect to said pressure tube.

6. The shock absorber according to claim 1 wherein said bleed passage is defined by a hole in said second retainer.

7. The shock absorber according to claim 1 wherein said second retainer defines a fluid chamber, said fluid chamber being in communication with said damping chamber.

8. The shock absorber according to claim 7 further comprising a valve disc slidingly received on said piston rod, said valve disc closing said fluid chamber when said valve disc is disposed adjacent said second retainer.

9. The shock absorber according to claim 8 further comprising a fulcrum disc disposed adjacent said valve disc, said valve disc bending at said fulcrum disc when fluid pressure within said fluid chamber exceeds a specified fluid pressure.

10. The shock absorber according to claim 1 further comprising a reservoir tube surrounding said pressure tube, said reservoir tube and said pressure tube defining a reservoir chamber.

11. A shock absorber comprising:
a pressure tube defining a working chamber;
a piston disposed within said working chamber, said piston dividing said working chamber into an upper working chamber and a lower working chamber;
a piston rod attached to said piston, said piston rod extending from said piston to a position outside said pressure tube;
an end cap attached to one end of said pressure tube;
a first retainer disposed within said pressure tube adjacent said end cap, said first retainer slidingly engaging said piston rod;
a second retainer disposed within said pressure tube, said second retainer slidingly engaging said piston rod;
a spring press fit against inside diameter of said pressure tube, said spring engaging said first retainer to maintain said first retainer adjacent said end cap, said spring being press fit to said second retainer; wherein:
said first and second retainers define a damping chamber disposed within said working chamber; and said second retainer defines a bleed passage in communication with said damping chamber and said working chamber.

12. The shock absorber according to claim 11 wherein said bleed passage is defined by a slot in said second retainer.

13. The shock absorber according to claim 12 further comprising a collar, disposed on said piston rod, said collar engaging said second retainer during movement of said piston with respect to said pressure tube.

14. The shock absorber according to claim 11 wherein said bleed passage is defined by a hole in said second retainer.

15. The shock absorber according to claim 11 wherein said second retainer defines a fluid chamber, said fluid chamber being in communication with said damping chamber.

16. The shock absorber according to claim 15 further comprising a valve disc slidingly received on said piston rod, said valve disc closing said fluid chamber when said valve disc is disposed adjacent said second retainer.

17. The shock absorber according to claim 16 further comprising a fulcrum disc disposed adjacent said valve disc, said valve disc bending at said fulcrum disc when fluid pressure within said fluid chamber exceeds a specified fluid pressure.

18. The shock absorber according to claim 11 further comprising a reservoir tube surrounding said pressure tube, said reservoir tube and said pressure tube defining a reservoir chamber.

* * * * *